May 11, 1943. J. M. ALVEY 2,318,658
BUCKET CONVEYER
Filed Sept. 8, 1941 4 Sheets-Sheet 1
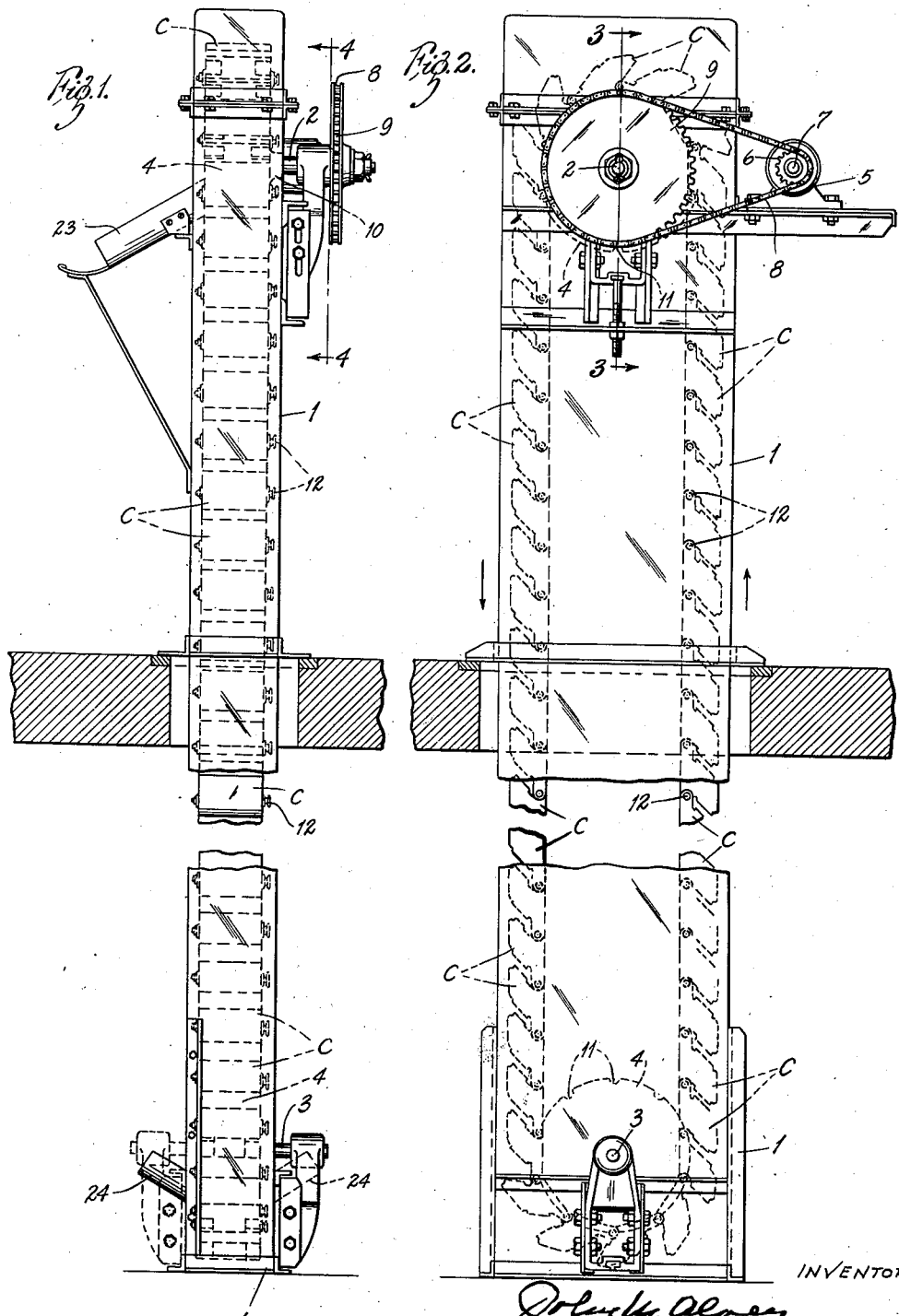
INVENTOR:
John M. Alvey
HIS ATTORNEYS

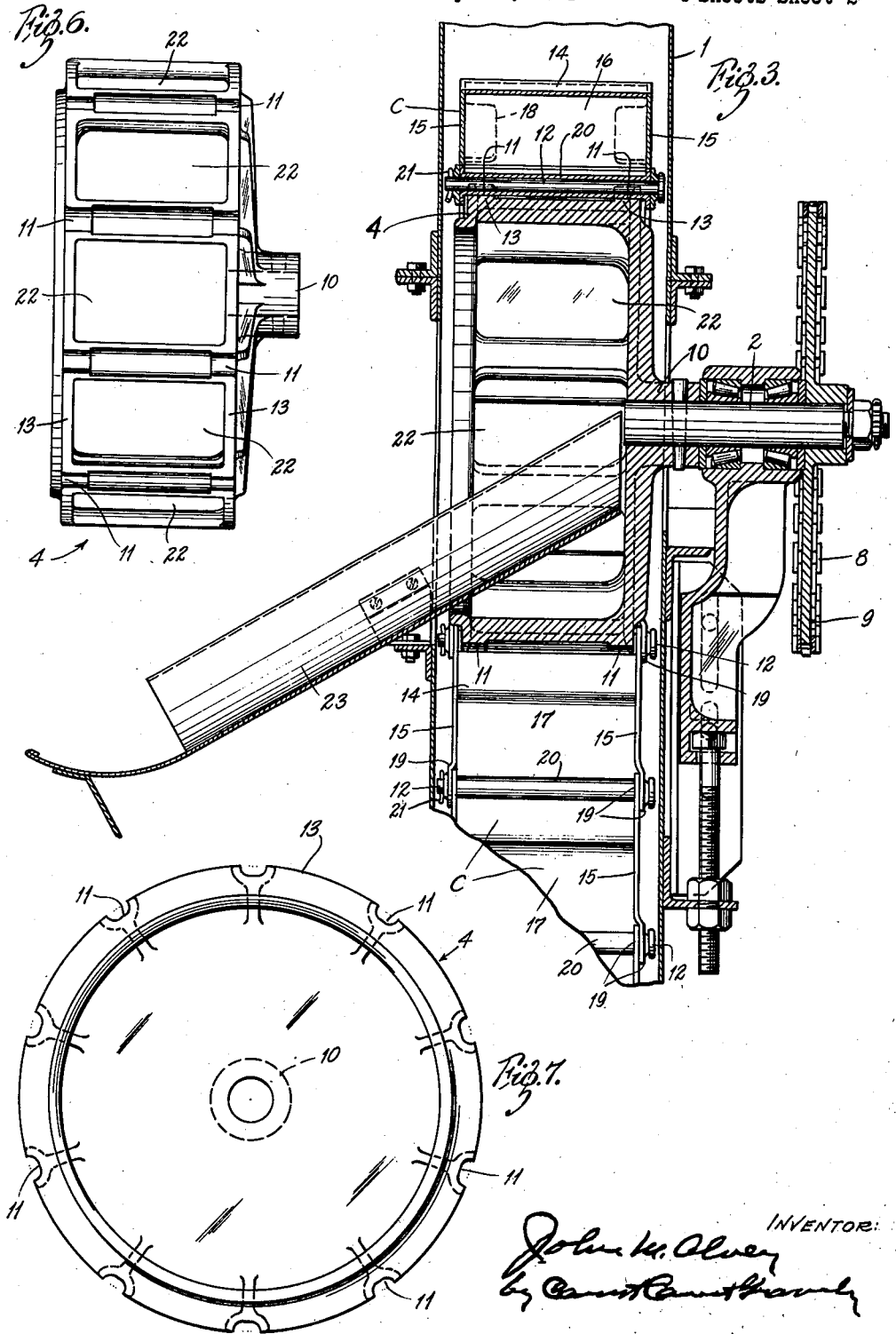

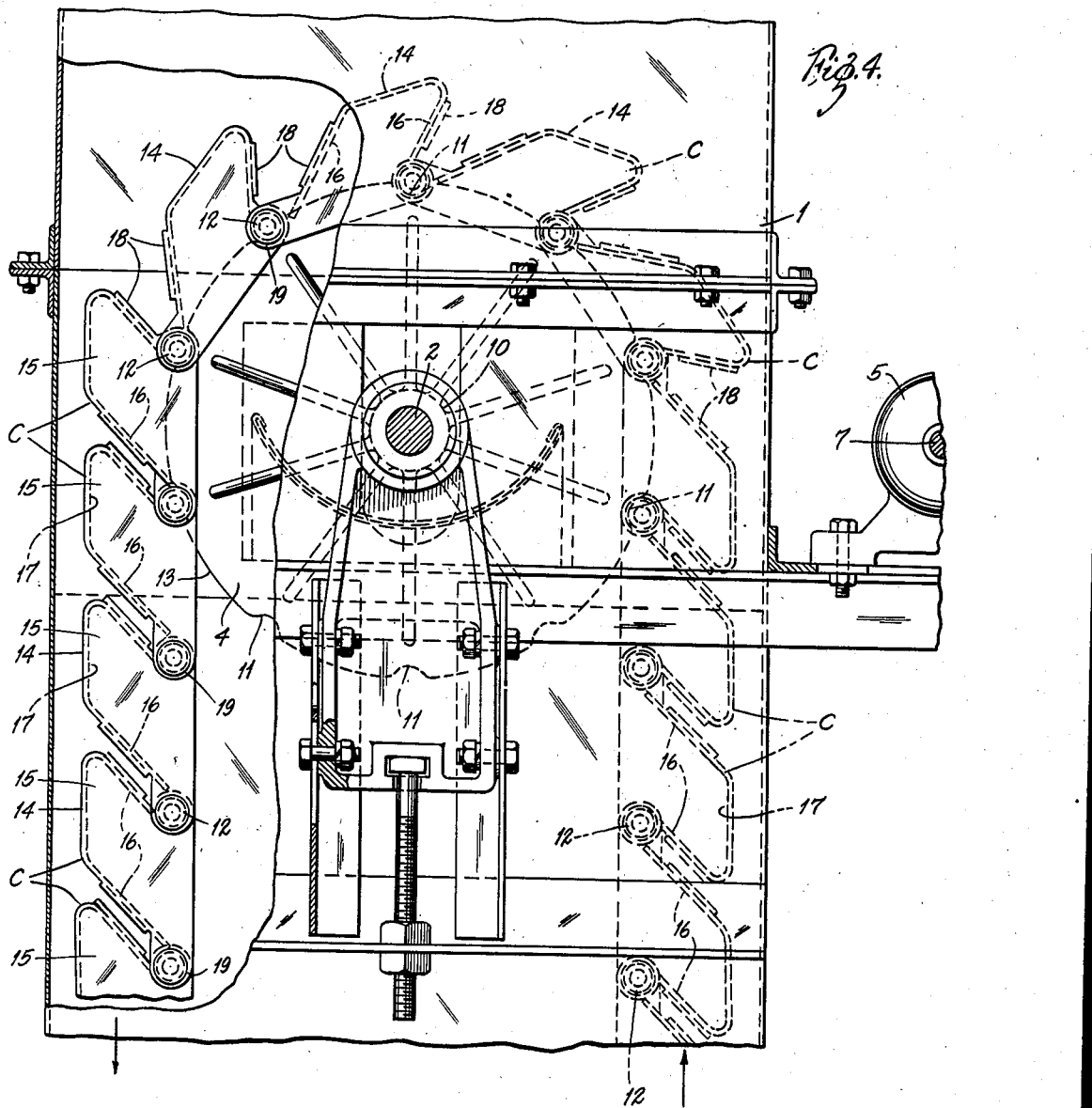

May 11, 1943.  J. M. ALVEY  2,318,658
BUCKET CONVEYER
Filed Sept. 8, 1941  4 Sheets-Sheet 4
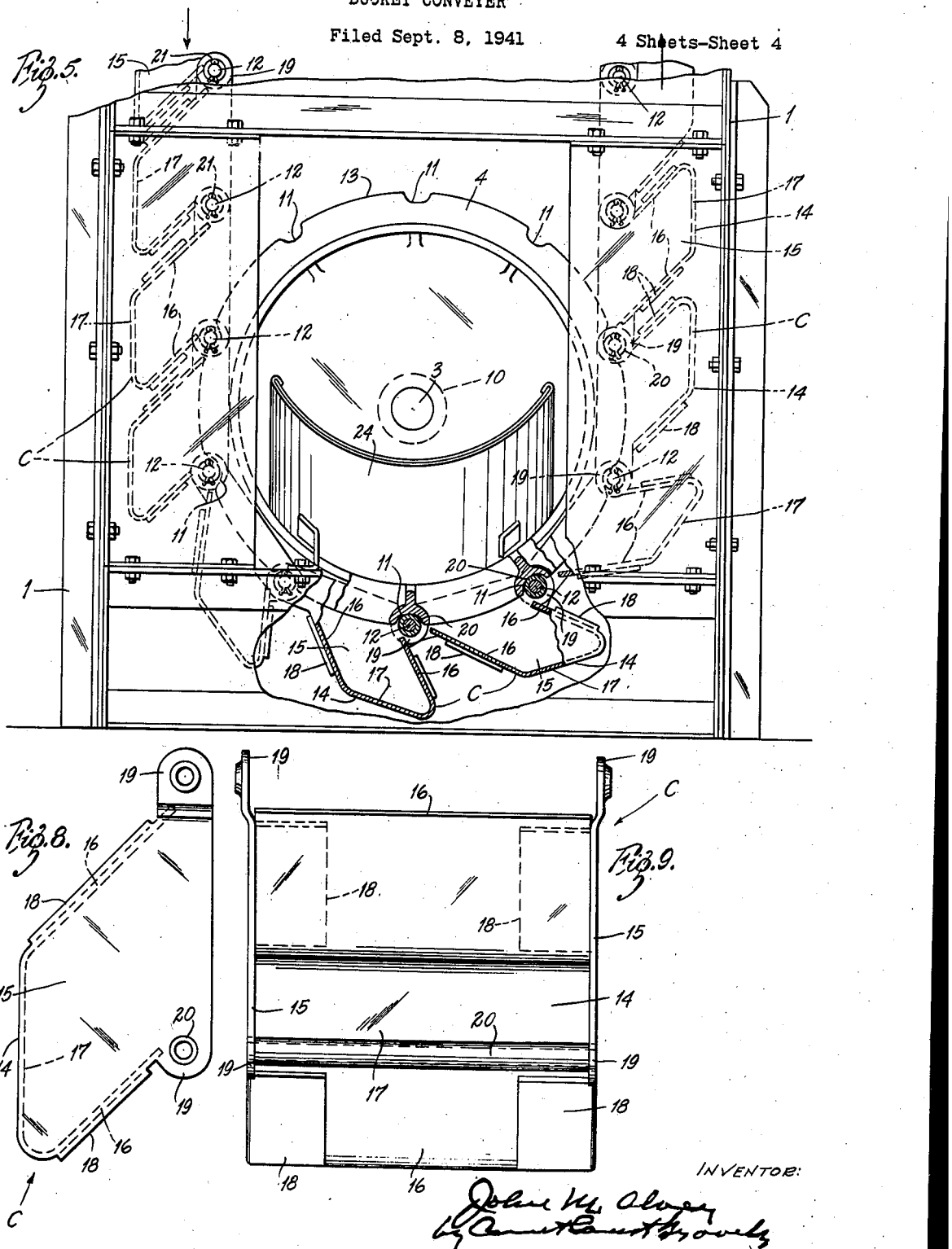
INVENTOR:
John M. Alvey
HIS ATTORNEYS.

Patented May 11, 1943

2,318,658

UNITED STATES PATENT OFFICE 2,318,658

BUCKET CONVEYER

John M. Alvey, Glendale, Mo., assignor to Alvey Conveyor Manufacturing Co., St. Louis, Mo., a corporation of Missouri Application September 8, 1941, Serial No. 409,945

6 Claims. (Cl. 198—142)

My invention relates to improvements in that type of endless conveyer wherein material is carried in buckets from a lower to a higher elevation. The principal objects of the invention are to simplify the construction and lessen the cost thereof, to make the links of the conveyer chains in the form of buckets hinged directly together; and to provide for loading and delivery of the material on either side of the apparatus. It consists in the construction and in the parts and combination of parts hereinafter described and claimed.

In the accompanying drawings wherein like reference numerals refer to like parts wherever they occur, Fig. 1 is a front elevation of a bucket conveyer embodying my invention, Fig. 2 is a side elevation thereof, Fig. 3 is an enlarged vertical longitudinal sectional view of the upper portion of said conveyer on the line 3—3 of Fig. 2, Fig. 4 is an enlarged view of the upper portion of the conveyer mainly in side elevation and partly in section on the line 4—4 of Fig. 1, Fig. 5 is an enlarged view partly in side elevation and partly in section of the lower portion of the conveyer, Figs. 6 and 7 are, respectively, side and end views of a sprocket drum, Figs. 8 and 9 are end and face views of a bucket; and Fig. 10 is a detail view of means for hinging pockets together.

My conveyer comprises a suitable framework or support 1, a driving shaft 2 and a driven shaft 3 rotatably mounted on said support, sprocket drums 4, 4 fixed on said shafts, an endless chain operatively connected to said sprocket drums and an actuating mechanism for actuating the drive shaft. In the construction illustrated, the actuating mechanism is a motor 5 having a sprocket pinion 6 on its shaft 7 which is connected by a sprocket chain 8 to a sprocket gear 9 on the driving shaft 2 which is at a higher elevation than the driven shaft.

The driving shaft 2 and the driven shaft 3 of the conveyer are stub shafts. Each of the sprocket drums 4, 4 that are fixed to said shafts is in the form of a cylinder that is open at one end and closed at the other, the closed end having at its center a hub 10 that is fixedly mounted on the end of the stub shaft, which shaft does not enter into the body portion of the drum. In order to adapt the drum to function as a sprocket wheel so as to drive or be driven by the conveyer chain, it is provided on its circumference with recesses 11 that are adapted to receive and cooperate with the hinge pins 12 of the chain hereinafter described. As illustrated in the drawings, each of the drums is provided with circumferential ribs 13 near its ends and the recesses 11 are formed in said ribs, the portion of the ribs between consecutive recesses constituting, in effect, a sprocket tooth.

The conveyer chain is composed of a series of buckets C directly hinged together. Each bucket, see Figs. 5, 8 and 9, is composed of three members, namely, the main body member 14 of the bucket and the two end members 15 of the bucket all preferably made of sheet metal suitably welded together. The main body member 14 is a strip bent transversely or rounded along two substantially parallel lines so that its end portions, which constitute the sides 16 of the bucket, stand out substantially parallel with each other and at an angle of forty-five degrees more or less to the middle portion thereof, which may be considered as the bottom 17 of the bucket. The two end members 15 of the bucket are lozenge shaped and have their ends 18 flanged or bent around and welded flatwise to the sides of the bucket. The end members of the bucket also extend further from the bottom of the bucket than the side members do and the outer corners 19 of each of said end members are formed into perforated ears or lugs, one of which is bossed up and offset relative to the other.

In order to constitute an endless conveyer chain, adjacent buckets are hinged directly together. For this purpose, the buckets are arranged in similar relation with their perforations in register, and with spacing tubes 20 alined therewith and with the hinge pins 12 or stove bolts extending through the alined perforations and spacing tubes and secured by cotter pins 21 or the like. The hinge pins enter the recesses in the periphery of the sprocket drum and drive or are driven thereby, as the case may be.

The distance between the perforations in the end of a bucket is somewhat longer than the length of the bucket opening and constitutes the effective length of a conveyer chain link and, therefore, is equal to the distance between the recesses of the sprocket drum.

In order to permit material to pass through a drum, the peripheral portion thereof is skeletonized; that is, large openings 22 are formed therein between or alternating with the recesses that serve for cooperation with the conveyer chain. Inside the upper sprocket drum is a chute 23 that inclines downwardly through the open end of said drum. At the open end of the lower sprocket drum is a chute 24 that inclines downwardly and inwardly so as to deliver material into the interior of said drum.

The operation of the apparatus hereinbefore described is as follows. When the actuating mechanism is set in motion, the upper drum is rotated thereby and, by reason of the engagement of the link pins in the recesses thereof, the conveyer chain is actuated and through it the lower sprocket drum. Material fed into the lower drum by means of the feed chute passes through peripheral openings therein into those buckets whose open ends are in register with said peripheral openings of the drum. The buckets thus filled are elevated to the top drum where they are inverted and, therefore, spill their contents through the peripheral openings in the drum and thence onto the delivery chute which passes them out through the open end of the drum.

The construction hereinbefore described has several important advantages. It is especially adapted for handling material in relatively small quantities and especially for handling articles, such, for instance, as cartridge shells, which would be seriously impaired by deformation. The parts are simple and easy to manufacture, especially as the drum may be cast in a single piece and the buckets may be made of sheet metal. As the chain consists wholly of buckets hinged directly together, the construction is simpler and involves less chain travel and may carry more material at a given speed or an equal amount of material at a lower speed than those constructions wherein the buckets are mere accessories of a chain.

What I claim is:

1. A bucket conveyer comprising hollow cylindrical sprocket drums that are closed at one end and open at the other end, supporting shafts for the respective drums located at the closed ends only thereof substantially entirely clear of the interior thereof, said drums having circumferentially spaced longitudinal grooves in their peripheral surfaces and plain radial openings through their cylindrical walls alternating with said grooves, and an endless sprocket chain comprising buckets and pins directly connecting adjacent buckets and adapted for operative engagement with the longitudinal peripheral grooves in said drums, said buckets opening on the inside of said chain and being adapted to register with and cover the radial openings therein.

2. A bucket conveyer comprising hollow cylindrical upper and lower sprocket drums that are closed at one end and open at the other end, supporting stub shafts for the respective drums located at the closed ends only thereof substantially entirely clear of the interior thereof, said drums having circumferentially spaced longitudinal grooves in their peripheral surfaces and plain radial openings through their cylindrical walls alternating with said grooves, an endless sprocket chain comprising buckets and pins directly connecting adjacent buckets and adapted for operative engagement with the longitudinal peripheral grooves in said drums, said buckets opening inwardly toward the axes of said drums and being adapted to register with and cover the radial openings therein, an inwardly and downwardly inclined feed chute extending inside of the lower drum through the open end thereof, and an outwardly and downwardly inclined delivery chute extending inside of the upper drum through the open end thereof, the interior of each of said drums being free of obstruction except for the chutes therein.

3. A bucket conveyer comprising one-piece hollow cylindrical upper and lower sprocket drums that are closed at one end and open at the other end, supporting stub shafts for the respective drums located at the closed ends only thereof substantially entirely clear of the interior thereof, said drums having circumferentially spaced longitudinal grooves in their peripheral surfaces and plain radial openings through their cylindrical walls alternating with said grooves, an endless sprocket chain comprising buckets and pins directly connecting adjacent buckets and adapted for operative engagement with the longitudinal peripheral grooves in said drums, said buckets opening inwardly toward the axes of said drums and being adapted to register with and cover the radial openings therein, a casing enclosing and supporting said drums and sprocket chain and having horizontal openings therein in register with the open ends of the respective drums, an inwardly and downwardly inclined feed chute extending inside of the lower drum through the open end thereof and the casing opening in register therewith, and an outwardly and downwardly inclined delivery chute extending inside of the upper drum through the open end thereof and the casing opening in register therewith.

4. An endless chain for a bucket conveyer comprising a series of inwardly opening buckets, each bucket consisting of a main member of sheet metal bent to form the bottom and two sides of the bucket and members of sheet metal having their ends bent around and welded flatwise to the sides of said main member and constituting the ends of said bucket, said ends extending further from the bottom of the bucket than the sides do, the free corners of said end having perforated ears that extend beyond the sides of said bucket, hinge pins extending from side to side of said chain through said perforated ears, and tubes surrounding said hinge pins between said ears and adapted for cooperation with sprocket elements.

5. A bucket for a bucket conveyer, said bucket consisting of a main member of sheet metal bent to form the bottom and two sides of the bucket and members of sheet metal having their ends bent around and welded flatwise to the sides of the main member and constituting the ends of the bucket, said ends extending further from the bottom of the bucket than the sides do, the free outer corners of said ends having perforated ears that extend beyond said sides and are adapted to receive hinge pins, the lug of each of said ends being offset relative to the other.

6. A sprocket member for a bucket conveyer comprising a one-piece hollow cylindrical drum that is closed at one end and open at the other end, said drum having circumferentially spaced longitudinal sprocket grooves in its peripheral surface and rectangular openings through its cylindrical wall alternating with said grooves, said drum having a shaft receiving hub integral with and on the exterior face only of said closed end thereof.

JOHN M. ALVEY.